(12) United States Patent
O'Ryan et al.

(10) Patent No.: US 7,258,784 B2
(45) Date of Patent: Aug. 21, 2007

(54) SOLID LIQUID FILTRATION APPARATUS AND METHOD

(75) Inventors: David E. O'Ryan, Clarkston, MI (US); Thomas P. Tripepi, Wickliffe, OH (US); Frank Schimmelmann, Clarkston, MI (US); Timothy D. Hanna, Portage, MI (US); Urs Herding, Ursensollen (DE)

(73) Assignee: Envirodyne Technologies, Inc., Kalamazoo, MI (US)

( * ) Notice: Subject to any disclaimer, the term of this patent is extended or adjusted under 35 U.S.C. 154(b) by 156 days.

(21) Appl. No.: 10/458,766

(22) Filed: Jun. 10, 2003

(65) Prior Publication Data

US 2004/0251216 A1    Dec. 16, 2004

(51) Int. Cl.
*B01D 24/46* (2006.01)

(52) U.S. Cl. .................. 210/108; 210/416.5; 210/510.1

(58) Field of Classification Search ................ 210/168, 210/232, 330, 493.1, 494.1, 510.1, 503, 506
See application file for complete search history.

(56) References Cited

U.S. PATENT DOCUMENTS

| | | | | |
|---|---|---|---|---|
| 2,887,228 A | * | 5/1959 | Harlan et al. ............... 210/108 |
| 2,999,597 A | * | 9/1961 | Harms ...................... 210/333.1 |
| 3,074,561 A | * | 1/1963 | Mummert ................. 210/333.1 |
| 3,556,304 A | | 1/1971 | Collard et al. .............. 210/489 |
| 3,585,133 A | * | 6/1971 | Honan et al. ............... 210/411 |
| 4,071,451 A | * | 1/1978 | Wood ......................... 210/741 |
| 4,394,272 A | * | 7/1983 | Damerau .................... 210/779 |
| 4,396,506 A | * | 8/1983 | Damerau .................... 210/107 |
| 4,673,502 A | * | 6/1987 | Fox ............................. 210/413 |
| 4,751,006 A | * | 6/1988 | Becker ........................ 210/774 |
| 4,761,226 A | * | 8/1988 | Creps ......................... 210/106 |
| 4,985,146 A | * | 1/1991 | Fox et al. ................... 210/413 |
| 5,167,839 A | * | 12/1992 | Widmer et al. ............. 210/784 |
| 5,221,469 A | * | 6/1993 | Nehls ......................... 210/232 |
| 5,279,734 A | * | 1/1994 | Nehls ......................... 210/295 |
| 5,547,481 A | * | 8/1996 | Herding et al. ............... 55/523 |
| 5,972,230 A | * | 10/1999 | Ely et al. .................... 210/797 |
| 6,331,197 B1 | * | 12/2001 | Herding et al. ............... 55/523 |
| 6,355,167 B1 | * | 3/2002 | Wensauer ................... 210/232 |
| 6,571,959 B1 | * | 6/2003 | Moore et al. ............... 210/394 |
| 2004/0251216 A1 | * | 12/2004 | O'Ryan et al. ............. 210/767 |

FOREIGN PATENT DOCUMENTS

| | | |
|---|---|---|
| DE | 196 30 852 | 2/1998 |
| DE | 197 15 196 | 1/1999 |
| JP | 59-141036 | 8/1984 |

OTHER PUBLICATIONS

"Gesinterte Kunststoff-Formteile für die Fest—/Flüssig-Filtration", by S. Strauβ, Technische Mitteilungen, Haus Der Technik, E. V., Essen, DE, vol. 85, No. 2, Jul. 1992, pp. 100-104.

* cited by examiner

*Primary Examiner*—Robert James Popovics
(74) *Attorney, Agent, or Firm*—Flynn, Thiel, Boutell & Tanis, P.C.

(57) ABSTRACT

A method and system for separating a particulate contaminate from a contaminated liquid medium involves filtering the contaminated liquid medium with a filter element having an afflux surface made of plastic particles that are sintered together. The contaminated liquid medium is introduced into a vessel, brought into contact with the filter element, where the liquid medium is separated from the particulate contaminant, and the separated liquid medium withdrawn from the filter element.

23 Claims, 1 Drawing Sheet

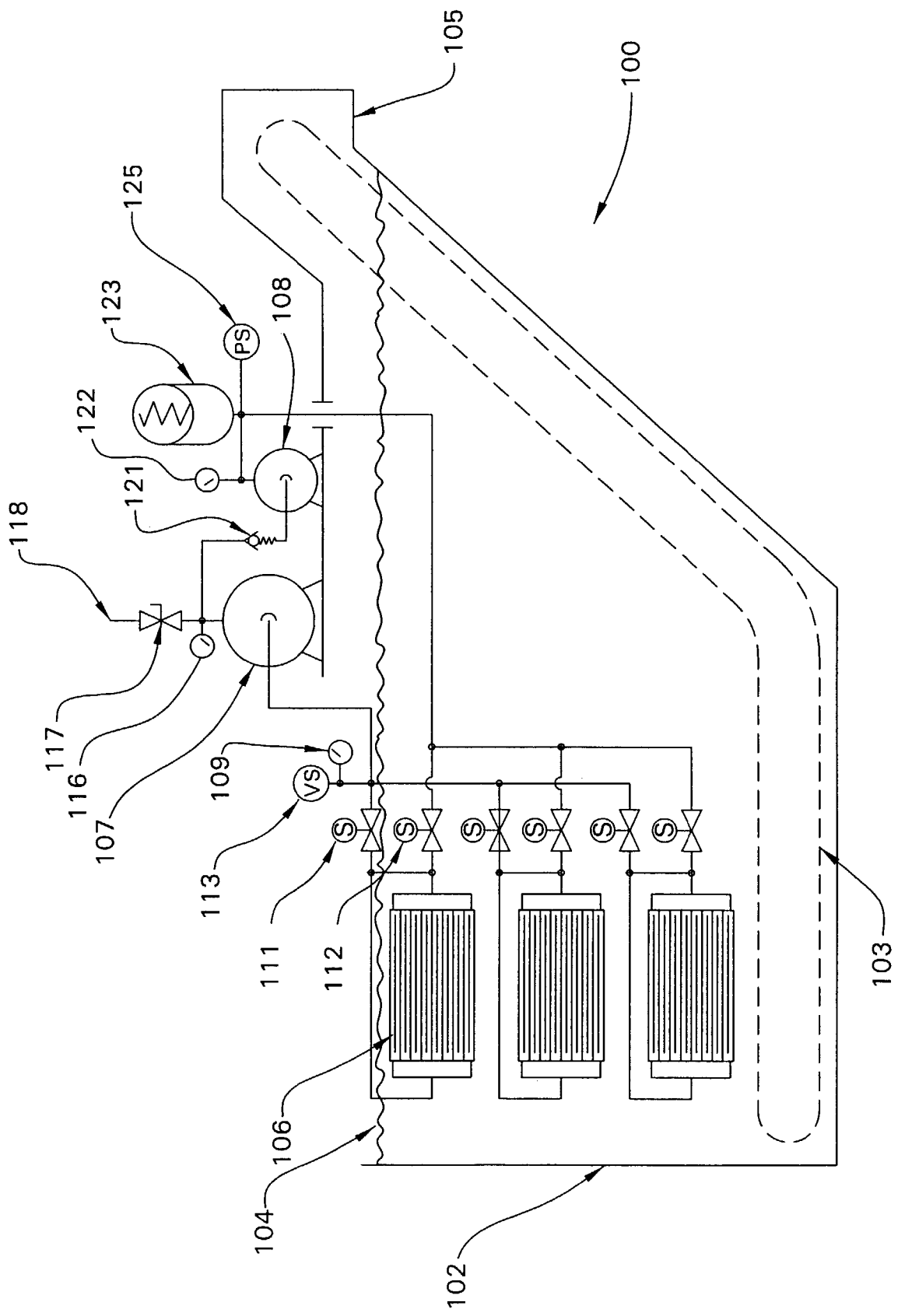

SOLID LIQUID FILTRATION APPARATUS AND METHOD

FIELD OF THE INVENTION

The invention relates to an improved system and method for removing a particulate contaminant from a contaminated liquid medium.

BACKGROUND OF THE INVENTION

In many different processes today, contaminated liquid streams are generated which contain particulate contaminants. Examples of contaminated liquid streams are liquid coolants from metal working processes containing metal particles, water used to wash workpieces from grinding applications, water containing lint and dirt from clothes washing processes and water containing sludge from waste water treatment processes. Due to environmental and/or economical concerns, it has become desirable to capture, reclaim and re-use these liquid streams after the removal of the particulate contaminants therefrom.

Filter media used in the separation of solids from a liquid typically are required to have six attributes. The filter media should have the ability to bridge solids across its pores within a reasonable time after the beginning of feed thereto, it should exhibit minimum resistance to the flow of filtrate, it should avoid the wedging of particles into its pores, which greatly increases the resistance to flow, it should have sufficient strength to withstand the filtering pressure and mechanical wear, it should be resistant to chemical attack and it should have a smooth surface for easy discharge of the deposited solids.

Of the filter media used today, cotton fabrics are the most common due to their cost and availability in a wide variety of weaves. However, cotton can be attacked by all mineral acids and by many organic acids that can crystallize at operating temperatures. Additionally, cotton fabrics are temperature sensitive and the operating temperature using this media should always be maintained below 200° F.

Filter papers and pulps are often used in processes requiring the retention of very fine solids and for the clarification of liquids containing a small amount of solids. These filter media are available in various degrees of permeability, thickness and strength and some are resistant to strong acids and alkalis. However, they must be well supported in the filter.

Metal fabrics are used in various types of solid-liquid filtration processes and have the advantages of a long life in corrosive and high-temperature environments. However, metal fabrics are expensive, cannot generally be used in the filtration of fine solids and tend to readily clog when soft amorphous particles are filtered. Although metal fabrics can be provided in special weaves which can be used to filter fine solids, these weaves tend to be very expensive and are very difficult to back-flush to remove the solids therefrom.

A wide variety of synthetic fibers is used as filter media in solid-liquid filtration due to their chemical resistance and resistance to bacterial attack. However, synthetic fiber filter media tends to be expensive and plug easily and cannot be used in very high temperature services.

Recently, filter elements having a body made from sintered plastic particles have been used to remove particles from air and gas streams. Herding, et al., U.S. Pat. No. 5,547,481, which is equivalent to DE 4211529A1, discloses a filter element having a permeable porous, substantially inherently stable shaped body made of ultrahigh-molecular, fine-grained polyethylene with an average molecular weight of more than $10^6$ and a further polyethylene component which is fine-grained in the initial state and has an average molecular weight of less than $10^6$. A fine-pore coating of small polytetrafluoroethylene is provided on the afflux side of the shaped body and fills at least part of the depth of pores present on the afflux surface of the shaped body. This reference states that it is critical that the coating fill at least a considerable depth of the surface pores. Although Herding, et al. states that the coated shaped body is suitable in general for separating particles from liquid or gaseous media to be filtered, the only contemplated and actual use of the filter element is the separation of solid particles from air and gaseous media. Herding, et al., U.S. Pat. No. 6,331,197, also discloses a sintered plastic particle filter element which is used to remove particulate materials from a gaseous media. The filter element of this reference avoids the mounting and reinforcing steel support members that are required in U.S. Pat. No. 5,547,481 by manufacturing the filter element by uniting two halves of sintered-together plastic particles, each containing a side wall. However, this filter also is only contemplated for use in separating particles from a gaseous stream.

Accordingly, it is an object of the present invention to provide an improved method and system for separating particulate solids from a contaminated liquid medium containing the particulate solids and in which a filter medium is used which has such a high durability it can be made permanent, shows a high ability in separating particulate solid contaminants from a liquid medium, can be used in a wide variety of services and is relatively inexpensive.

SUMMARY OF THE INVENTION

The above and other objects of the present invention are met by providing an improved method and system for separating a particulate contaminant from a liquid medium containing the particulate contaminant in which the liquid medium containing the particulate contaminant is contacted with a filter element formed from sintered plastic particles.

In the improved method and system of the present invention, a liquid medium contaminated with a particulate contaminant is introduced into a vessel. The filter element is placed in the contaminated liquid medium and a vacuum pulled thereon to bring the contaminated liquid medium into intimate contact with an afflux surface of the filter element. Particulate solid contaminants are retained on the afflux surface of the filter element while clean liquid medium passes therethrough and is removed from the filter element. The deposited particulate contaminants can be removed from the afflux surface of the filter element by back-flushing the filter element and the particulate contaminants removed therefrom settle to the bottom of the vessel where they can be removed therefrom. By providing more than one filter element in the liquid bath, the filtration process can be made continuous in that the filter being back-flushed can be taken off line while other filter elements are in service.

Other objects and purposes of the present invention would be readily apparent to people familiar with this technology upon reading the following specification and inspecting the accompanying drawing.

BRIEF DESCRIPTION OF THE DRAWING

The FIGURE is an illustration of a liquid filtration system of the present invention.

DETAILED DESCRIPTION

The filter element used in the present invention is prepared according to the methods described in U.S. Pat. Nos. 5,547,481 and 6,331,197 to Herding, et al. and the disclosures of these patents are incorporated herein by reference thereto. The filter elements of Herding, et al. are disclosed as being used in the separation of contaminants from a gas stream. Surprisingly, the present inventor discovered that a sintered plastic particle filter element, such as disclosed in U.S. Pat. No. 5,547,481, could be used in the separation of particulate solids from a liquid medium without the provision of a fine pored coating of a fine grained material on an afflux surface of the filter element.

For convenience purposes, the drawings used in U.S. Pat. No. 6,331,197 will be used in the description of the present invention utilizing the same numerals to designate the same elements. However, it must be recognized that the filter element of the present invention is not limited in configuration to the filter elements shown in U.S. Pat. Nos. 5,547,481 and 6,331,197, and can be of any desired configuration, such as tubular or in the form of a flat sheet. As described in U.S. Pat. No. 6,331,197, the filter element 1 is formed from sintered-together plastic particles and has substantially the shape of a narrow, hollow box with two large zigzag or corrugated first side walls 7 having peaks and valleys, two narrow second side walls 33 interconnecting the first side walls 7, a bottom side and an opposite top side. Both of the bottom side and the top side may be open or one of the bottom and the top side may be closed in the present invention. Preferably, both the bottom and top sides are open to aid in the back-flushing of the filter element 1. The peaks and valleys of the first side walls extend in the direction of the bottom side to the top side and the bottom side, when closed, is further provided with a foot 3. The bottom side, when open, and the top side further have a head 5 attached thereto which is elongate and constitutes at least one flow passage 19 in the embodiment of the present invention where the bottom side is closed and the top side is open. When both the bottom and the top sides are open, an elongate head constituting at least one flow passage can be attached to both the bottom and the top sides.

The filter element is made of two unified halves 37 and 39 with each half containing one of the first side walls 7. In a preferred embodiment, the head 5 and foot 3 are cast of a synthetic resin with the head being cast on the first and second side walls 7 and 33 such that the head surrounds and seals an outer surface of the first and second side walls with a first part of its height 23 and extends beyond the first and second side walls with the second part of its height 25 to cover the ends thereof.

Although the head and foot are preferably cast of a synthetic resin and can be formed integral with the side walls, the present invention is not limited thereto. The head and foot can be made of any suitable material such as a metal, ceramic, etc., and can be adhered to the side walls by any suitable method or means as long as an effective seal is formed between the side walls and the head and the foot.

In one embodiment of the present invention, the head forms in the second part of its height, in the at least one flow passage, a transition from a space 17 confined between the first two side walls to a substantially rectangular cross-section at an upper portion thereat.

Although FIG. 2 of U.S. Pat. No. 6,331,197 shows the flow passage as having a trapezoidal-or-funnel-shaped cross-section, the present invention is not limited thereto and can have any shaped cross-section, such as a square, rectangular, etc., if desired.

The side walls 7 and 33 of the filter element 1 are made from sintered-together plastic particles with polyethylene being a preferred material of construction. Additionally, mixtures of various plastic particles, such as ultra high-molecular and high-molecular plastic particles, can also be used in the present invention depending on the particular application. The pore size of the side walls can be controlled through the particle size and the sintering process during the manufacture of the structure. However, the provision of a finer-porosity coating of polytetrafluoroethelyene particles, or fibers, or a mixture of particles and fibers, on the side walls is not necessary in the present invention.

The FIGURE illustrates a piping arrangement for the present invention. The flow passage 19 inside the head 5 is in fluid communication with the hollow space 17 provided between the side walls 7, filter pump 107 for withdrawing liquid medium from the hollow space and back-flush booster pump 108 for back-flushing the filter element 106 with clean liquid medium or another fluid.

It has been discovered that the filter element used in the inventive method and filtration system has unexpectedly wide applicability in various liquid-solid separation processes.

The present invention has been shown to be extremely effective in removing dirt and fine metal chips and shavings from synthetic, semi-synthetic and water-soluble metal working coolants, dirt and particulate contaminants from waste waters such as laundry discharge and bilge water and indigenous species such as fish eggs, zebra mussels, etc. that may be found in ballast water. The particulate solids removable by the present invention include, but are not limited to, ferrous and non-ferrous metals, glass, ceramics, plastics and rubber. The liquid medium containing the particulate contaminant can be water, an organic liquid, an inorganic liquid and mixtures thereof. The process and system of the present invention are particularly advantageous when used to filter particulate solids from a metal-working coolant.

The filter element of the present invention can serve as a permanent filter media and has the advantages of 100% of the coolant passing through the media, obtaining zero by-pass, without hardly ever having to replace the media due to normal operational conditions. The sintered plastic structure of the filter element has a natural support structure that allows a heavy cake to be built up without tearing or collapsing. This heavy cake allows the media to reach previously unattainable filtration levels by a back-flushable filter media on a full flow basis. Additionally, the filter element achieves an unexpectedly long steady state operating condition in that the pressure drop across the filter element with respect to time reaches a steady state plateau when a certain amount of filter cake has built up on the filter element and can operate substantially at this plateau for an extended period of time. In contrast thereto, conventional filter elements operate with the pressure drop across them increasing in a linear fashion until it reaches a peak and then have to be taken out of service while they are back-flushed, cleaned or removed. As such, the present invention allows for superior filtration over an extended period of time as compared to conventional liquid filtration filter elements. The media can be pressure washed several times prior to clogging and then regenerated after years of use. The filter element has been shown to remove particulate solids down to the size of 10 microns or lower.

The operation of a liquid filtration system 100 of the present invention is illustrated in the FIGURE. 102 denotes a filter tank which serves as a vessel for containing a contaminated liquid medium 104. Sintered plastic particle filter elements 106 are placed in a contaminated liquid medium and are connected to a filter pump 107 such that a vacuum is pulled on the filter element to cause the contaminated liquid medium to come into intimate contact with side walls of the filter element and form a layer of deposited particulate contaminant thereon while clean liquid medium flows to the filter pump 107 to be discharged out of the system at the filter pump discharge 118. A back-flush booster pump 108 is connected to the discharge of the filter pump 107 and is used to pressurize the filter element 106 so that the deposited particulate layer is removed off of the side walls of the filter element 106 and settles to the bottom of the filter tank 102 where a removal means 103, such as a tank chain and a flight drag-out, carries the solid sludge to the discharge 105 of the filter tank 102.

A suction control valve 111 and back-flush control valve 112 is provided for each filter element to control the filtration and back-flushing operation thereof. A vacuum gauge 109 monitors the degree of vacuum being pulled on the filter element and a vacuum switch control 113 can time and switch the vacuum among the three filter elements 106 shown in the FIGURE. The pressure gauge 116 is provided in the filter pump discharge line in order to monitor the pressure in the discharge line and a control valve 117 is provided in the filter pump discharge line in order to regulate the flow of filtrate from the system. A check valve 121 is provided in the inlet line to the back-flush booster pump 108 to prevent back flow from the booster pump and a pressure gauge 122 is provided in the booster pump discharge line in order to monitor the pressure thereof. A pressure accumulator 123 is also provided in the discharge line of the back-flush booster pump 108 and a pressure switch 125 is provided in the discharge line of the back-flush booster pump to maintain pressure in the pressure accumulator 123. The determination of and initiation of a back-flushing cycle can be based on either when the system vacuum switch 113 reaches its set point or can be timer-activated. In the configuration shown in the FIGURE, a filter element 106 can be taken off line and back-flushed while the other two filters remain in operation. This enables a continuous operation of the liquid filtration system.

The method and liquid filtration system of the present invention offers the advantages in that has a smaller foot print or takes less space than systems that are currently available on the market. Additionally, the filter elements can be mounted either vertically or horizontally in the tank for customization purposes. An air or fluid back flush can be used to regulate cleaning the filter elements, thereby creating a continuous operation, self-cleaning and lower periods between maintenance. Additionally, this system of the present invention can be easily retrofitted into existing filtration systems.

While a particular preferred embodiment of the invention has been disclosed in detail for illustrative purposes, it will be recognized that variations or modifications of the disclosed system and process including the rearrangement of parts and steps, will not weaken the scope of the present invention.

What is claimed is:

1. In a liquid filtration system comprising a vessel, a contaminated liquid medium containing a particulate contaminant provided in the vessel, a filter element provided in the contaminated liquid medium for separating the liquid medium from the particulate contaminant and means for removing the separated liquid medium from the filter element, the improvement comprising the filter element is formed from sintered-together plastic particles and has substantially the shape of a narrow, hollow box with two large zigzag or corrugated first side walls having peaks and valleys, two narrow second side walls interconnect the first side walls, a bottom side and an opposite top side, the peaks and valleys of the first side walls extend in the direction from the bottom side to the top side and the top side further has a head attached thereto which is elongate and constitutes at least one flow passage, the filter element further comprising two unified halves, each half containing one of the first side walls, the head being provided on the first and second side walls such that the head surrounds and seals an outer surface of the first and second side walls with a first part of its height and extends beyond the first and second side walls with a second part of its height and an afflux surface of the filter element consists essentially of sintered-together plastic particles; a filter pump for removing clean liquid medium and a back-flush booster pump connected to the discharge of the filter pump for pressurizing a filter element and removing a deposited particulate layer therefrom; and a pressure accumulator and a pressure switch provided in the discharge of the back-flush booster pump.

2. The system of claim 1, wherein a second head which is elongate and constitutes at least one flow passage is provided on the bottom side.

3. The system of claim 1, wherein the bottom side is closed and a foot is provided thereon.

4. The system of claim 1, wherein the head is made of a synthetic resin and cast on the first and second side walls.

5. The system of claim 1, wherein the head has a rectangular cross-section in an upper portion thereof which gradually transitions to a space provided between the first side walls.

6. The system of claim 1, wherein the liquid medium is a coolant used in metal working.

7. The system of claim 1, wherein the particulate contaminant is at least one member selected from the group consisting of: metal, glass, plastic, ceramic and rubber.

8. The system of claim 1, wherein the liquid medium comprises water.

9. The system of claim 1, wherein the liquid medium comprises an organic compound.

10. The system of claim 1, wherein the particulate contaminant is a non-ferrous metal.

11. The system of claim 1, wherein the particulate contaminant is a ferrous metal.

12. The system of claim 1, wherein the contaminated liquid medium is selected from the group consisting of waste water containing dirt and particulate contaminants and ballast water containing indigenous species.

13. The system of claim 1, wherein the improvement additionally comprises a plurality of filter elements formed from sintered-together plastic particles are provided in the contaminated liquid medium and the filter elements are mounted in a vertical orientation.

14. The system of claim 1, wherein the improvement additionally comprises a plurality of filter elements formed from sintered-together plastic particles are provided in the contaminated liquid medium and the filter elements are mounted in a horizontal orientation.

15. The system of claim 1, wherein the improvement additionally comprises means for removing the separated contaminant from the bottom of the vessel.

16. In a liquid filtration system comprising a vessel, a contaminated liquid medium comprising a coolant used in metal working and a particulate contaminant comprising at least one member selected from the group consisting of metal, glass, plastic, ceramic and rubber provided in the vessel, a filter element provided in the contaminated liquid medium for separating the liquid medium from the particulate contaminant and means for removing the separated liquid medium from the filter element, the improvement comprising the filter element is formed from sintered-together plastic particles and has substantially the shape of a narrow, hollow box with two large zigzag or corrugated first side walls having peaks and valleys, two narrow second side walls interconnect the first side walls, a bottom side and an opposite top side, the peaks and valleys of the first side walls extend in the direction from the bottom side to the top side and the top side further has a head attached thereto which is elongate and constitutes at least one flow passage, the filter element further comprising two unified halves, each half containing one of the first side walls, the head being provided on the first and second side walls such that the head surrounds and seals an outer surface of the first and second side walls with a first part of its height and extends beyond the first and second side walls with a second part of its height and an afflux surface of the filter element consists essentially of sintered together plastic particles; a filter pump for removing clean liquid medium and a back-flush booster pump connected to the discharge of the filter pump for pressurizing a filter element and removing a deposited particulate layer therefrom; and a pressure accumulator and a pressure switch provided in the discharge of the back-flush booster pump.

17. The system of claim 16, wherein a second head which is elongate and constitutes at least one flow passage is provided on the bottom side.

18. The system of claim 16, wherein the bottom side is closed and a foot is provided thereon.

19. The system of claim 16, wherein the head is made of a synthetic resin and cast on the first and second side walls.

20. The system of claim 16, wherein the head has a rectangular cross-section in an upper portion thereof which gradually transitions to a space provided between the first side walls.

21. The system of claim 16, wherein the improvement additionally comprises a plurality of filter elements formed from sintered-together plastic particles are provided in the contaminated liquid medium and the filter elements are mounted in a vertical orientation.

22. The system of claim 16, wherein the improvement additionally comprises a plurality of filter elements formed from sintered-together plastic particles are provided in the contaminated liquid medium and the filter elements are mounted in a horizontal orientation.

23. The system of claim 16, wherein the improvement additionally comprises means for removing the separated contaminant from the bottom of the vessel.

* * * * *